Nov. 14, 1972  R. C. CLARK  3,702,659
FILTER CORES

Filed Nov. 26, 1969  4 Sheets-Sheet 1

RAYMOND C. CLARK
INVENTOR.

BY *Lillian S. Rhine*

ATTORNEY

Nov. 14, 1972  R. C. CLARK  3,702,659
FILTER CORES
Filed Nov. 26, 1969  4 Sheets-Sheet 4
FIG. 5
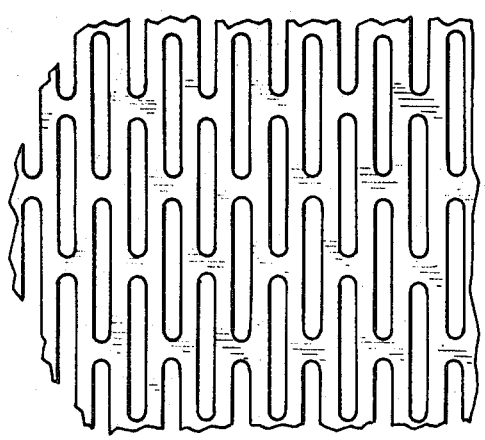
FIG. 6
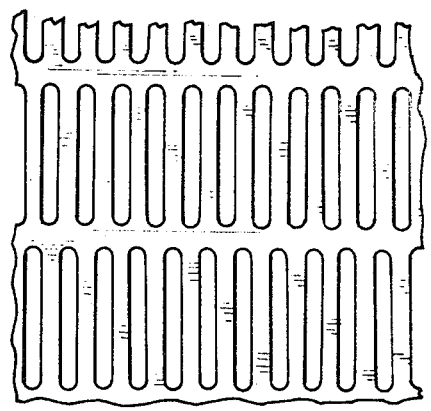
FIG. 8
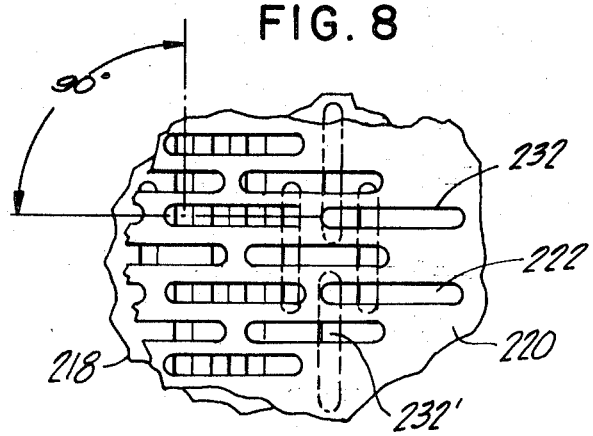
FIG. 7
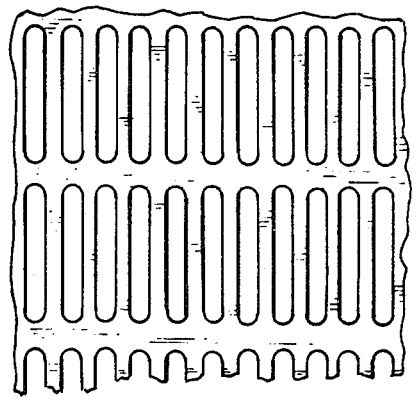
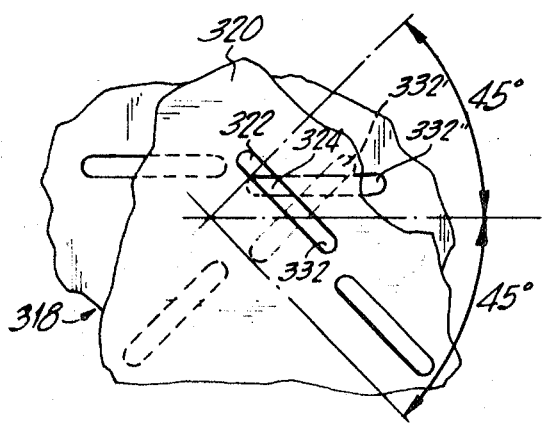
FIG. 9

United States Patent Office 3,702,659
Patented Nov. 14, 1972

3,702,659
FILTER CORES
Raymond C. Clark, Orange, Conn., assignor to
Brunswick Corporation, Chicago, Ill.
Filed Nov. 26, 1969, Ser. No. 880,108
Int. Cl. B01d 29/34, 25/26
U.S. Cl. 210—343                        11 Claims

ABSTRACT OF THE DISCLOSURE

The present invention relates to filters, for example, disc type filters useful in the production of polymers. More particularly, it relates to disc type filter cores which serve at least two functions: (1) adding support to the filter media, and (2) providing continuous filtrate flow passages during the filtering process attendant to such production. Each filter core comprises at least two discs in face-to-face relation, at least one of the discs having elongated apertures therein and at least one other disc having at least one elongated filtrate conduit means therein. The apertures and the filtrate conduit means cooperatively form a continuous fluid passage such that, for example, for a given filtrate flow velocity, filter media support may be maximized.

BACKGROUND OF THE INVENTION

Generally, disc type filters comprise a series of disc type filter elements stacked on a central hub within a filter housing such that each filter element is spaced from adjacent filter elements a predetermined distance. Although variations of the particular means of operation may exist, generally, such filters operate by forcing the filtrate, that is, the fluid which passes through the filter unit during the filtering process, into the housing, through the filter elements positioned therein, and then out of the housing. The filtrate is caused to flow through the filtering apparatus as a result of a pressure differential between the points of filtrate ingress and egress. Generally, each filter element comprises a filter media affixed to both surfaces of a filter core which usually is a woven screen-like structure. The filter media may comprise any of many well-known materials useful in filtration processes utilizing, for example, disc type filter elements. For example, the filter media may be made from sintered powder metal, sintered fiber metal, sintered nylon, or even finely woven fabric of metal or synthetic material. The filter core serves the dual purpose of providing a means for adding support to the filter media and an opening or path for the filtrate to travel along before or after passage through the filter media, thereby providing a continuous filtering operation. The filter media may be affixed to the surface(s) of the filter core, as, for example, by welding.

Traditionally, the filter core has comprised a woven screen-like structure to which the filter media is affixed. Although other types of filter cores have been used, they all have the same limitations and shortcomings as compared to the filter cores described herein; that is, heretofore filter manufacturers have been unsuccessful in the design of a filter core which will provide satisfactory filter media support for a prolonged period of time for a given filtrate flow velocity. For example, this problem has been particularly acute in those cases where the filter core comprises a woven screen-like structure and the filtrate is subjected to pressures in excess of 1800 p.s.i. In such cases, the screening does not provide satisfactory support for the filter media; that is, since the filter media is supported by the raised knuckles of the woven screen, the stress loading at these points resulting from such high pressures causes the filter media to yield locally and tend to conform to the contour of the strands or yarns from which the screen is woven. Since the nature of the filtrate flow passages is such that the filtrate must travel along the open area provided between adjacent strands which comprise the screen-like structure at the surface(s) of the filter core, the "conforming" action of the media reduces the flow area by plugging up these openings. The openings are further plugged up due to an accumulation, at the points where the media yields locally upon the strands, of portions of the filter media which may break away from the filter media and migrate into the filtrate. The problem tends to be increasingly compounded in that the reduction in flow area is cumulative. That is, the continuing "conforming" action of the filter media tends to completely close more and more filtrate flow passages until a point is reached when passage through the filter unit is completely blocked.

Attempts have been made to reduce the tendency of the constituent material of the filter media to yield locally about the strands or yarns which comprise the woven screen-like filter core by reducing the distance between adjacent strands of the "screen," it being believed that the "conforming" action is dependent upon, in part, the width of each flow passage; that is, the narrower the flow passage, the less tendency for the filter media to yield locally about each strand and plug up the flow passage. However, tests of the ability of a filter media, such as fiber metal, to span between support points while subjected to pressures of about 4000 p.s.i. and above, indicate that the support points should be less than $\frac{1}{8}$ of an inch apart, and as close together as $\frac{1}{16}$ of an inch. Manufacturers of filters find such a structure objectionable because such a dense screen mesh tends to impede the filtrate flow.

A further disadvantage which results from the use of filter cores produced from woven screen-like material is that for a given filtrate subjected to a given pressure gradient, it has been necessary to use different screen-like filter cores when a change in the filtrate flow velocity is desired. That is, in order to change the filtrate flow velocity in such cases, it has been necessary to change the entire filter unit and/or use a filter core, the mesh size of which is greater or less, respectively, than that which was presently being used, depending on whether an increase or decrease in filtrate flow velocity is desired.

Still a further disadvantage which results from the use of screen-like filter cores is that such filter cores do not provide a means for minimizing the change in the pressure drop across the filter; that is, due to the linearity of the constituent strands or yarns of the woven core, and therefore the linearity of the filtrate flow passages between these strands, the filter core provides uniform resistance to filtrate flow throughout the filter core.

Accordingly, it is an object of this invention to provide a filter core whereby for a given filtrate flow velocity, filter media support may be maximized.

Another object of this invention is to provide a filter core which provides for continuous filtrate flow.

Still another object of this invention is to provide a filter core whereby migration of any constituent of the filter media is impeded from exiting from the filter unit and thereby contaminating the filtrate.

A further object of this invention is to provide a filter core whereby the filtrate flow velocity may be varied for any given pressure or vacuum.

Still a further object of this invention is to provide a filter core whereby the change in the pressure drop across the filter is kept to a minimum.

SUMMARY OF THE INVENTION

This invention achieves these and other objects by means of a filter unit having disc type filter cores for adding support to the filter media and providing continuous filtrate flow passages during the filtering process, which filter cores comprise a first disc having elongated slots therein, and a second disc, one surface of which has more than one elongated filtrate conduit means therein. One surface of the first disc is contiguous with the surface of the second disc which has filtrate conduit means therein such that the apertures and the filtrate conduit means cooperatively form a continuous fluid passage whereby the filtrate serpentines throughout the discs which comprise the filter core, and, for example, enters the hub of the filter unit by means of which it exits from the filter unit.

DESCRIPTION OF DRAWINGS

FIG. 5 is a fragmentary plan view of another filter core disc useful in the practice of the present invention.

FIG. 6 is a fragmentary plan view of still another filter core disc useful in the practice of the present invention.

FIG. 7 is a fragmentary plan view of yet another filter core disc useful in the practice of the present invention.

FIG. 8 is a fragmentary plan view of a filter core useful in the practice of the present invention.

FIG. 9 is a fragmentary plan view of still another filter core useful in the practice of the present invention.

DESCRIPTION OF PREFERRED EMBODIMENT

Figure 1:
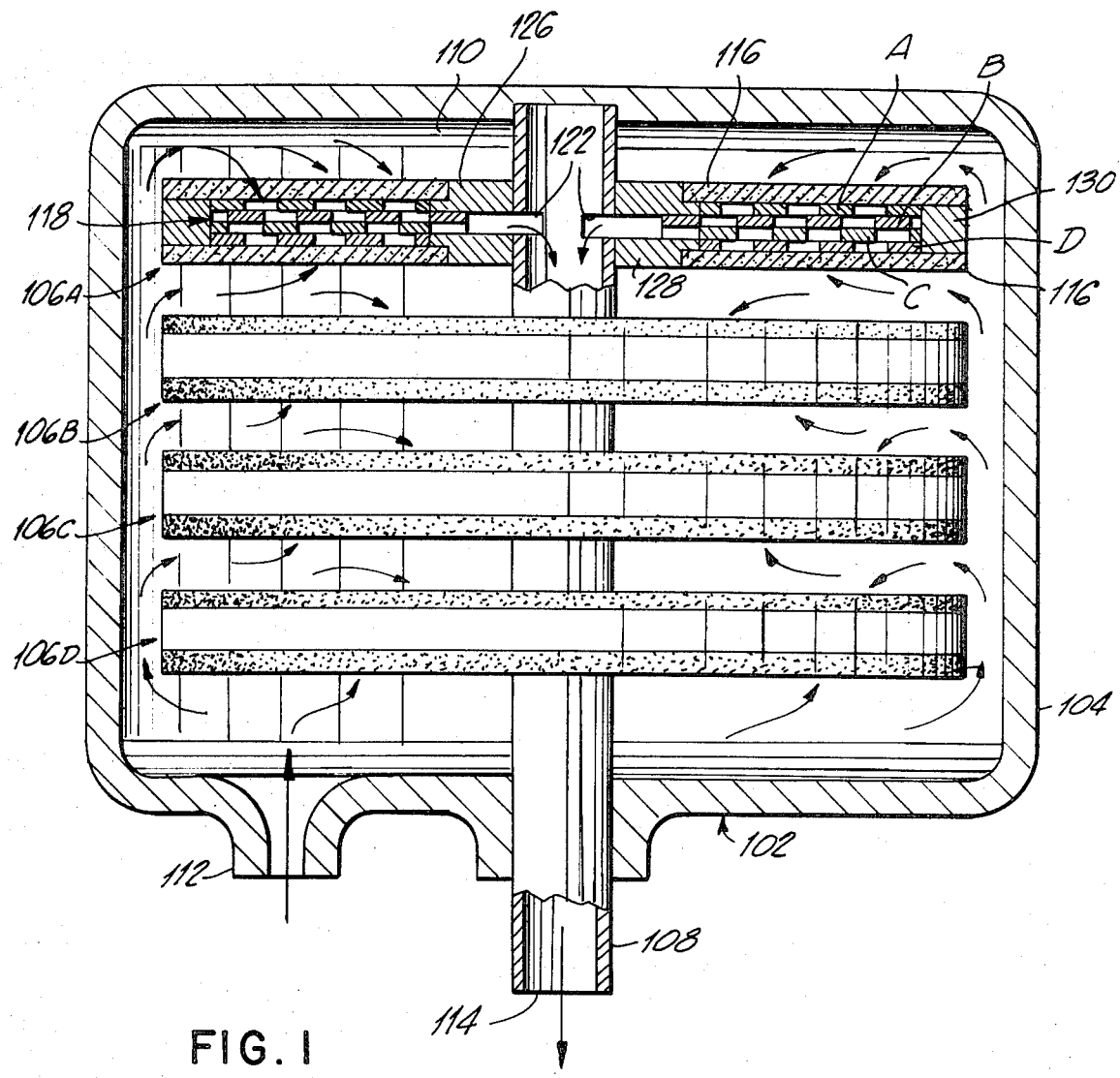
FIG. 1 is a cross-sectional representation of a disc type filter embodying the present invention.
Figure 3:
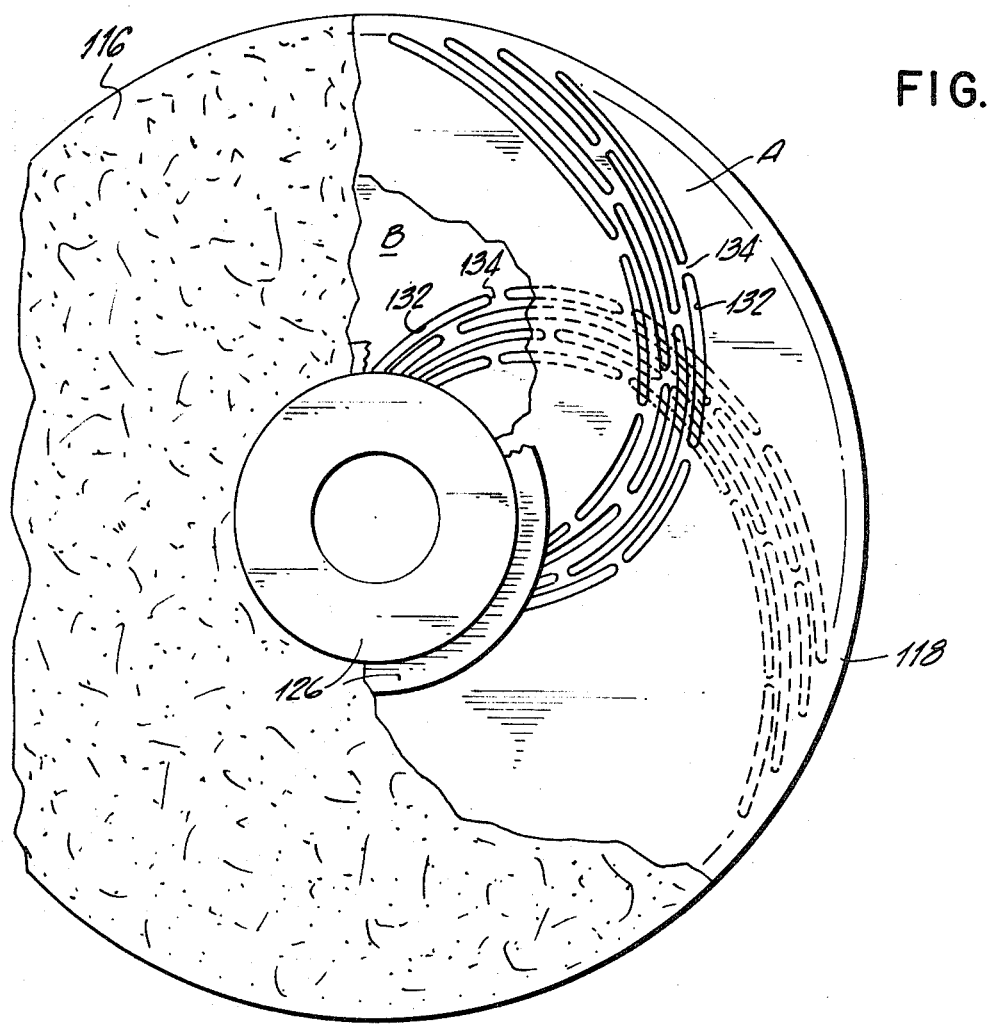
FIG. 3 is a plan view of a disc type filter element useful in the practice of the present invention.
Figure 2:
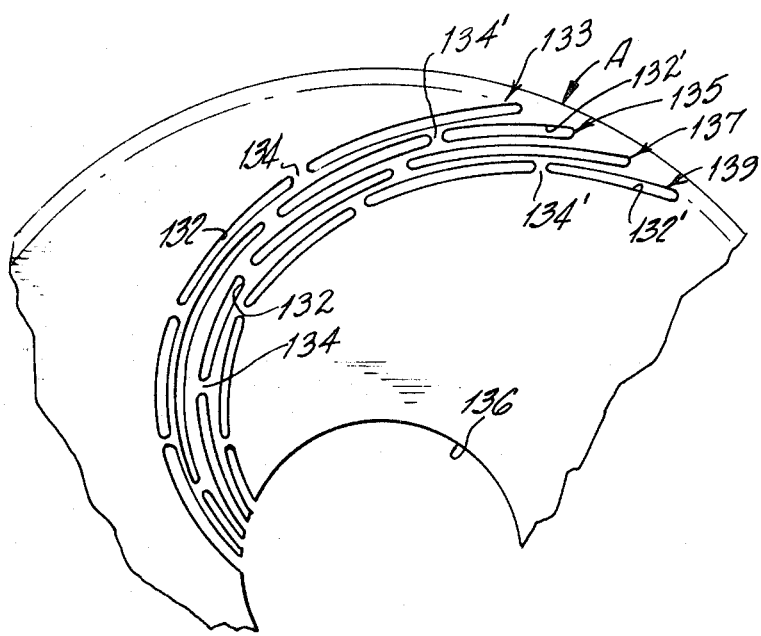
FIG. 2 is a fragmentary plan view of a filter core disc useful in the practice of the present invention.

The embodiment of this invention which is illustrated in FIGS. 1, 2 and 3, is one which is particularly suited for achieving the objects of this invention. FIG. 1 depicts a disc type filter unit 102 which comprises a housing 104 having, for example, filter elements 106a, 106b, 106c and 106d, stacked on hollow hub 108 and positioned within the internal chamber 110. Filtrate ingress and egress means are provided at apertures 112 and 114. Each filter element comprises a filter media 116 affixed to both surfaces of a filter core 118, as by welding. Hub 108 has at least one aperture or opening 122 therein which communicates with the filter core 118 as described hereinafter. As depicted in FIG. 1, filter element 106 is affixed to upper annular flange 126 and lower annular flange 128 as, for example, by welding. Annular flanges 126, 128 are affixed to hub 108. The outer peripheral edge of the filter element 106, may be sealed, as, for example, by affixing a sealing member 130 to the filter media 116, as by welding.

In operation, the filtrate (depicted by arrows) is injected under pressure into the internal chamber 110 through aperture 112. Subsequently, the filtrate is forced through the filter media 116 and traverses generally radially within filter core 118 and through the opening 122 into hollow hub 108, as described in greater detail hereinafter. Finally, the filtrate is forced out of hollow hub 108 through aperture 114, and, for example, collected by suitable means not shown. In the alternative, the filtrate may be subjected to a vacuum and/or the direction in which the filtrate flows may be reversed.

Although filter media 116 may be comprised of any of many well-known materials useful in filtration processes utilizing, for example, disc type filter elements, in the preferred embodiment depicted in FIG. 1, the filter media 116 comprises sintered metal fiber material. Such a structure is a porous, bonded mat of randomly oriented, more or less uniformly distributed metal fibers in which the individual fibers are bonded to adjacent fibers at spaced points along the fiber where such fiber contacts adjacent fibers by means of metallurgical bonds. The metal fiber structure may be made, for example, in accordance with the teachings of and by the process described in United States patent application of Walter C. Troy, U.S. Pat. No. 3,127,668.

Referring to FIGS. 1, 2 and 3, in the preferred embodiment of the present invention each filter core 118 comprises four discs, generally denoted A, B, C and D. By the use of the word "disc" it is not meant to limit the present invention to circular structures. For example, other plate-like structures, including discs, are also within the teachings hereof. For example, the present invention contemplates the use of rectangular plate-like structures. Although more or less than four discs may be used, in order for the present invention to properly function there must at least be a first disc having elongated apertures therein, and a second disc one surface of which has more than one elongated filtrate conduit means therein, one surface of the first disc being contiguous with the surface of the second disc which has the conduit means therein, the apertures and conduit means cooperatively forming a continuous fluid passage. By filtrate conduit means is meant an elongated channel in the disc in question; that is, for example, an elongated aperture or slot, or groove. By continuous fluid passage is meant a combination of apertures and fluid conduit means juxtaposed such that the filtrate can pass through an aperture in a first disc, enter and travel along a filtrate conduit means in an adjacent second disc, subsequently flow into some other aperture in the first disc, or some other adjacent disc, and so on, whereby the filtrate serpentines throughout the discs which comprise the filter core, and, for example, exits from the filter unit by means of the hub. For example, the filtrate conduit means may comprise an elongated channel or groove in the second disc whereby the filtrate can pass through an aperture in the first disc, travel along the length of the channel in the second disc, and subsequently flow into some other aperture in the first disc.. Alternatively, the filtrate conduit means may comprise an elongated aperture. In such cases, the filtrate can pass through an aperture in the first disc, travel along the length of the aperture in the second disc, and subsequently flow into some other aperture in the first disc, or some other adjacent disc. The passage of the filtrate through the filter core of the present invention will be described in greater detail hereinafter.

FIG. 2 depicts one of the discs which may comprise filter core 118. For purposes of illustration only, disc A will be described as representative of discs B, C and D, it being understood, however, that in this particular embodiment the filtrate conduit means in discs B and C can comprise elongated channels or grooves rather than the apertures which are referred to herein. Although not necessary, as depicted in FIG. 2, disc A is preferably circular, having radial-spiral oriented rows 133, 135, 137, 139 of spiral oriented apertures or perforations 132, 132' therein being separated by "bridge" portions 134, 134'; that is, the solid portion of disc A between adjacent apertures in each row. Although not necessary, the spiral oriented apertures have their long axes oriented along the collective line of their collective spiral orientation. The preferred spiral pattern in each disc will be described in more detail hereinafter. Disc A has a hub opening 136 therein which is designed such that hub 108 will fit into the opening. Although not necessary, hub opening 136 may be circular, the diameter being large than the diameter of hub 108, hub 108 also being circular in this embodiment. The material from which disc A may be manufactured is not critical to this invention provided the composition filter core has the requisite strength for adding support to the filter media and maintaining filtrate flow passages during the filtering process at the desired filtrate flow velocity. For example, in the preferred embodiment, disc A comprises stainless steel.

As noted above, in the preferred embodiment of the present invention, each filter core 118 comprises four discs generally denoted A, B, C and D, each disc having spiral oriented apertures therein, as illustrated in FIG. 2. Adjacent discs are inverted such that the radial-spiral patterns alternate clockwise, counterclockwise, clockwise, counterclockwise; that is, the spiral oriented rows of apertures in every other disc extend in a clockwise direction while the spiral oriented rows of apertures in adjacent discs extend in a counterclockwise direction. In this manner, continuous flow paths are provided from the inner chamber 110 to the hollow hub 108 by means of the partially hollow filter core assembly 118. For example, and referring to FIGS. 1, 2 and 3, the filtrate (depicted by arrows) enters the internal chamber 110 of filter unit 102 through aperture 112. Subsequently, the filtrate passes through filter media 116 and traverses internally, in a generally spiral oriented radial direction, along the perforations 132, 132' in the various discs A, B, C and D which comprise the filter core 118. By way of example only, the filtrate moves radially, in a clockwise direction, along the length of a slot or aperture 132, 132' in disc A until a "bridge" 134, 134' is reached. Then, the filtrate traverses vertically into an adjacent slot 132, 132' in adjacent disc B and moves radially, in a counterclockwise direction along same until another "bridge" 134, 134' is met, whereupon it again traverses vertically into another adjacent slot 132, 132' in adjacent disc A. The filtrate then moves radially, in a clockwise direction along slot 132, 132' in disc A until another "bridge" 134, 134' is met, whereupon the filtrate traverses vertically into an adjacent slot 132, 132' in adjacent disc B. In this manner, the filtrate flows from internal chamber 110, traverses in a generally spiral-radial direction along the flow passages provided within filter core 118, flowing from the apertures in disc A to disc B to disc A to disc B to disc A to disc B, etc., and into the hollow hub 108. Similarly, the filtrate flows from the perforations in disc D to disc C to disc D to disc C to disc D to disc C, etc., and into hollow hub 108.

Figure 4:
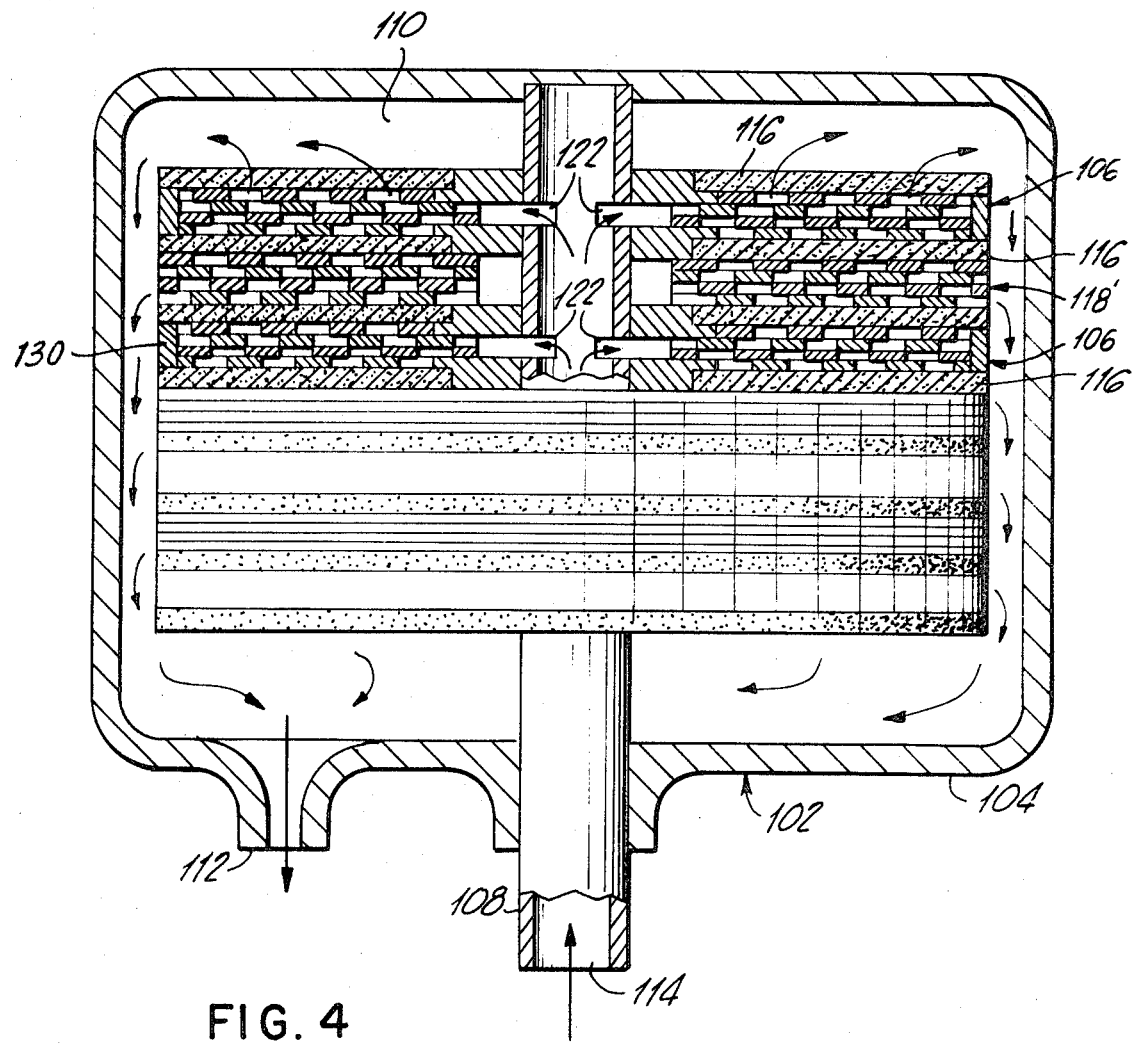
FIG. 4 is a cross-sectional representation of another disc type filter embodying the present invention.

Alternatively, the flow of the filtrate may be reversed; that is, the filtrate may enter the filter unit 102 through aperture 114 and leave filter unit 102 through aperture 112. When such is the case, it is desirable to space each filter element 106 in such a manner that the filter media 116 is supported externally. For example, as depicted in FIG. 4, individual filter elements 106 are spaced by means of a filter core 118', which is in face-to-face engagement with the filter media 116, thereby lending support to filter media 116. In operation, the filtrate is forced into hub 108 at aperture 114 and flows through the opening 122 in hub 108 into filter elements 106. In this case, the filtrate flows away from hub 108 in a spiral-radial direction along the perforations 132, 132' in discs A, B, C and D, as noted above, and through filter media 116. Subsequently, the filtrate flows from filter media 116 into internal chamber 110 by means of filter core 118' in a manner similar to that which the filtrate flows through filter core 118. Finally, the filtrate is forced through aperture 112 into suitable collecting means.

Although not necessary, preferably, the radial-spiral pattern in each disc is such that every second spiral slot in each row is "bridged" at radius intermediate to the radius "bridge" positions of adjacent slots in the same row, as is depicted in FIG. 2; that is, every second aperture in each row of apertures is bridged at a radial distance on the disc intermediate to the radial distance on the disc of bridge positions of adjacent apertures. When the longest axes of the apertures in one disc are angularly disposed relative to the longest axis of, for example, the apertures in an adjacent disc, this spiral pattern is preferred since by alternately juxtapositioning such discs clockwise, counterclockwise, etc., the slots or apertures in adjacent discs intersect at preferred high angles, thereby providing a composite flow path having a minimum tortuous path. Since repeated twists, bends or turns in a flow path will tend to increase flow resistance, by minimizing the tortuosity of the flow path, resistance to flow decreases.

It should be noted, however, that the present invention is not limited to a composite filter core comprising alternately juxtaposed discs having spiral oriented rows of spiral oriented apertures therein. For example, in certain cases, the discs may be positioned in face-to-face relationship such that they are not alternately juxtaposed; that is, the spiral oriented rows in adjacent discs may extend, for example, in a clockwise direction. By way of example only, and referring to FIG. 2, when a spiral-radial pattern in each disc is such that every second spiral slot in each row is bridged at radius intermediate to the radius bridge positions of adjacent slots in the same row, as described herein, a continuous fluid passage as taught herein can be perfected by juxtaposing a first disc A upon a second disc A such that the longest axes of the apertures in rows 133 and 137 of said first disc A are in vertical alignment or are congruent with the longest axes of the apertures in rows 135 and 139 of said second disc A, and the longest axes of the apertures in rows 133 and 137 of said second disc A are in vertical alignment or are congruent with the longest axes of the apertures in rows 135 and 139 of said first disc A. In addition, it should be noted that in certain cases where the row pattern in adjacent discs differs, the discs may be positioned in face-to-face relationship such that they are not alternately juxtaposed. It should be further noted that the apertures do not need to be spiral oriented but rather can be, for example, substantially rectangular. In addition, a filter core which falls within the teachings of the present invention may comprise multiple layers of slotted discs in face-to-face relation wherein the slots in each disc are angularly disposed relative to the slots in adjacent discs; that is, neither the apertures nor the rows of apertures are spiral oriented. For example, each disc may comprise a multiplicity of rows of rectangular apertures, the longest axis of each of said apertures in each respective row being substantially parallel to and equidistant from the longest axis of each of the apertures in at least one adjacent row, the shortest axis of each of the apertures in each respective row being substantially parallel to and equidistant from the shortest axis of each of the apertures in at least one adjacent row, all of the apertures having substantially the same configuration. For example, the slots may be side staggered, as depicted in FIG. 5, end staggered, as depicted in FIG. 6, or in an end-to-end pattern as depicted in FIG. 7. The manner in which the individual discs are stacked, that is, the angular disposition of the slots in any disc relative to the slots in adjacent discs, as well as the number of discs stacked in any given composite filter element, will depend upon the filtrate flow velocity desired for the degree of pressure to which the filtrate flow is being subjected. For example, and referring to FIG. 8, it has been found that when the slots are side staggered, as depicted in FIG. 5, maximum filter media support and filtrate flow area is achievable by producing a filter core assembly 218 comprising two discs 220, 222 in face-to-face relation such that the slots 232 in disc 220 are disposed 90° to the slots 232' in adjacent disc 222. Similarly, it has been found that when the slots are end staggered, as depicted in FIG. 6, or when an end-to-end pattern is used, as depicted in FIG. 7, then, and referring to FIG. 9, maximum filter media support and filtrate flow area is achieved by producing an individual filter unit 318 comprising three discs 320, 322, 324 in face-to-face relation such that the slots 332 in disc 320 are disposed at an angle of 45° to the slots 332' in disc 322, which slots are disposed at an angle of 45° to the slots 332" in disc 324.

In all of the embodiments described herein, the rate of filtrate flow may be increased or decreased for any given degree of pressure or vacuum by, for example, juxtaposing adjacent discs in such a manner as to increase or decrease the cross-sectional area of the continuous fluid passage in the discs. For example, by changing the angular disposition of the slots in one disc relative to those in an adjacent disc, the open flow area and tortuosity of the flow path will be increased or decreased, the flow velocity of the filtrate thereby being increased or decreased respectively. In addition, the flow of the filtrate may be facilitated by tapering the apertures or slots; that is, by providing slots which are narrower at the outer edge of the disc and become wider as they approach the hub. In this manner, any change in the pressure drop which the filtrate may be subjected to as it flows through the filter may be minimized. This may be particularly useful in low pressure applications. Notwithstanding the exact aperture configuration, or angular disposition of apertures in adjacent discs relative to each other, however, in order for the present invention to work, the manner in which the apertures in a first disc are disposed relative to the filtrate conduit means in an adjacent disc must at least be such that the fluid passage perfected is continuous such that the filtrate will traverse through the open space within the filter core and be discharged therefrom.

Filter cores which embody the teachings of the present invention are preferred over the woven screen-like filter cores heretofore used in that due to the increased filter media support area, the internal flow passages will not become closed as a result of the "conforming" action of the filter media as described above. Accordingly, one of the advantages deriving from the use of such filter cores is that a filter media which is relatively weak structurally may be used. For example, a fiber metal filter media having a high degree of permeability may be utilized. Heretofore the use of such a structure was impracticable because the more permeable the media, the weaker the media, and therefore, the greater the tendency for the media to conform to the contour of the strands or yarns of the screen-like filter core.

By means of this invention, filter cores are provided whereby for a given filtrate flow velocity, filter media support may be maximized. For example, as a result of using a filter core which comprises a series of discs, each disc having apertures therein which are angularly disposed relative to apertures in adjacent discs thereby forming a continuous fluid passage, a uniform "land" area between adjacent slots, and, correspondingly, a uniform open area, may be maintained. For example, it is possible to produce a filter core which will maintain a 50 percent open area and 50 percent land area during substantially the entire filtering process. In this manner, maximum filtrate flow is facilitated.

Although all of the discs may have slots or apertures therein as described above, the teachings of the present invention are applicable to filter cores comprising at least one disc having elongated apertures therein and at least one other disc one surface of which has more than one elongated filtrate conduit means therein. In such cases the description herein relating to, for example, row patterns and aperture configurations is applicable to the filtrate conduit means, which may comprise, for example, grooves or apertures, and the apertures in said one disc.

EXAMPLE

A filter core embodying the present invention was produced by juxtaposing four stainless steel discs having spiral oriented rows of spiral oriented apertures or slots therein, adjacent discs being inverted such that the spiral pattern was clockwise, counterclockwise, clockwise, counterclockwise. The spiral oriented apertures in each disc were such that every second aperture in each row of apertures was "bridged" at a radial position intermediate to the radial bridge positions of adjacent apertures in the same row. The apertures were about 1/16 inch wide and the land area between adjacent slots was about 1/16 inch, thereby providing a filter core having approximately 50 percent flow area and 50 percent support area. The four discs were welded together to form the composite filter core, and a sintered fiber metal filter media was welded to both sides thereof. The resulting filter element was positioned in a disc type filter unit as described above and used to successfully filter molten polyester resin, which filtrate was injected into the filter at pressures as high as 10,000 p.s.i. The temperature of the resin was about 600° F. and the viscosity was about 300,000 centipoises, the pressure drop across the filter being about 5,000 p.s.i.

It is to be understood that in the foregoing specification and the attached drawings, the specific embodiments and components thereof which have been illustrated and discussed are by way of illustration and not of limitation and that this invention may be practiced by those skilled in the art utilizing a wide variety of materials and configurations without departing from the true spirit and scope of this invention.

I claim:

1. A filter core comprising a first plate having elongated apertures therein, and a second plate, one surface of which has more than one elongated filtrate conduit means therein, one surface of said first plate being contiguous with said one surface of said second plate, said apertures and said conduit means cooperatively forming a continuous serpentine fluid passage in a radial fashion.

2. The article described in claim 1 wherein said conduit means comprises grooves.

3. The article described in claim 1 wherein said conduit means comprises apertures.

4. The article described in claim 3 wherein each of said plates comprises a multiplicity of rows of said apertures, the longest axis of each of said apertures in each respective row being substantially parallel to and equidistant from the longest axis of each of said apertures in at least one adjacent row,
the shortest axis of each of said apertures in each respective row being substantially parallel to and equidistant from the shortest axis of each of said apertures in at least one adjacent row,
all of said apertures having substantially the same configurations.

5. The article described in claim 1 wherein said apertures and said conduit means are spiral oriented.

6. The article described in claim 3 wherein said plates comprise a multiplicity of radial-spiral oriented rows of said apertures, said apertures in each of said rows being disposed such that every second aperture is bridged at a radial distance on the plate intermediate to the radial distance of bridge positions of adjacent apertures.

7. The article described in claim 6 wherein said rows in one of said plates extend in a clockwise direction and said rows in said other plate extend in a counterclockwise direction.

8. The article described in claim 6 wherein said apertures are spiral oriented and have their long axes oriented along the collective line of their collective spiral orientation.

9. The article described in claim 7 wherein said apertures are spiral oriented and have their long axes oriented along the collective line of their collective spiral orientation.

10. A filter core for a plate type filter comprising
a first plate having a multiplicity of radial-spiral oriented rows of spiral oriented apertures,
a second plate having a multiplicity of radial-spiral oriented rows of spiral oriented apertures,
a third plate having a multiplicity of radial-spiral oriented rows of spiral oriented apertures,
a fourth plate having a multiplicity of radial-spiral oriented rows of spiral oriented apertures, said apertures in each of said rows in each respective plate being disposed such that every second aperture is bridged at a radial distance on the plate intermediate to the radial distance on the plate of bridge positions of adjacent apertures, one surface of said first plate being contiguous with one surface of said second plate,
the other surface of said second plate being contiguous with one surface of said third plate,
the other surface of said third plate being contiguous with one surface of said fourth plate,
said rows in said first and said third plates extending in a clockwise direction,
said rows in said second and said fourth plates extending in a counterclockwise direction,
said apertures in each of said rows having their long axes oriented along the collective line of their collective spiral orientation.

11. The filter core of claim 1 wherein said plates are constructed to be moved relative to each other.

References Cited
UNITED STATES PATENTS

| 2,084,753 | 6/1937 | Watson et al. | 210—541 |
| 3,398,833 | 8/1968 | Marks et al. | 210—347 X |

FRANK A. SPEAR, Jr., Primary Examiner

U.S. Cl. X.R.

210—347, 486